United States Patent
Omiya et al.

(10) Patent No.: US 9,874,132 B2
(45) Date of Patent: Jan. 23, 2018

(54) INFORMATION-DISPLAY-EQUIPPED ELECTRIC-HEATING-TYPE HEATER AND METHOD OF USING INFORMATION THEREFOR

(71) Applicant: NGK Insulators, Ltd., Nagoya (JP)

(72) Inventors: Yoshimasa Omiya, Nagoya (JP); Takashi Noro, Nagoya (JP); Kazumi Mase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 550 days.

(21) Appl. No.: 14/493,542

(22) Filed: Sep. 23, 2014

(65) Prior Publication Data

US 2015/0007553 A1  Jan. 8, 2015

Related U.S. Application Data

(63) Continuation of application No. PCT/JP2013/054627, filed on Feb. 22, 2013.

(30) Foreign Application Priority Data

Mar. 29, 2012 (JP) ................................ 2012-077871

(51) Int. Cl.
*B01D 50/00* (2006.01)
*F01N 11/00* (2006.01)
(Continued)

(52) U.S. Cl.
CPC ............ *F01N 11/00* (2013.01); *F01N 3/2013* (2013.01); *F01N 3/2026* (2013.01);
(Continued)

(58) Field of Classification Search
CPC .... F01N 3/2013; F01N 11/00; F01N 2240/16; Y02T 10/47; Y02T 10/26
(Continued)

(56) References Cited

U.S. PATENT DOCUMENTS 5,229,079 A  7/1993 Harada et al.
5,229,080 A  7/1993 Abe et al.
(Continued)

FOREIGN PATENT DOCUMENTS

DE  10 2011 017 674 A1  1/2012
EP  1 486 255 A1  12/2004
(Continued)

OTHER PUBLICATIONS

Japanese Office Action (Application No. 2014-507535) dated Nov. 8, 2016 (with English translation).
(Continued)

*Primary Examiner* — Tom P Duong
(74) *Attorney, Agent, or Firm* — Burr & Brown, PLLC (57) ABSTRACT

There are disclosed an information-display-equipped electric-heating-type heater, and a method of using the above information. An information-display-equipped electric-heating-type heater includes a tubular honeycomb structure made of a conductive material and having porous partition walls to define and form a plurality of cells which become through channels for a fluid and extend from one end face to the other end face, and a circumferential wall positioned in an outermost circumference; and a pair of electrodes disposed on the circumferential wall of the honeycomb structure, and information concerning a heater performance of the electric-heating-type heater is displayed in the honeycomb structure.

14 Claims, 2 Drawing Sheets

(51) Int. Cl.
*F01N 3/20* (2006.01)
*F01N 3/28* (2006.01)
*H05B 3/18* (2006.01)

(52) U.S. Cl.
CPC .............. *F01N 3/2828* (2013.01); *H05B 3/18* (2013.01); *F01N 2240/16* (2013.01); *F01N 2260/24* (2013.01); *H05B 2203/024* (2013.01); *Y02T 10/26* (2013.01); *Y02T 10/47* (2013.01)

(58) Field of Classification Search
USPC ....................... 422/174, 180; 55/523; 60/274
See application file for complete search history.

(56) References Cited

U.S. PATENT DOCUMENTS

| | | | |
|---|---|---|---|
| 5,234,668 A | 8/1993 | Harada et al. | |
| 5,264,186 A | 11/1993 | Harada et al. | |
| 2002/0118238 A1 | 8/2002 | Suzuki et al. | |
| 2005/0123716 A1 | 6/2005 | Miwa et al. | |
| 2006/0269722 A1 | 11/2006 | Yamada | |
| 2008/0187729 A1* | 8/2008 | Johnson | B41M 5/0047 428/210 |
| 2008/0280064 A1 | 11/2008 | Tokunaga et al. | |
| 2011/0265460 A1 | 11/2011 | Hirai et al. | |
| 2011/0305601 A1 | 12/2011 | Kawase et al. | |

FOREIGN PATENT DOCUMENTS

| | | | | |
|---|---|---|---|---|
| EP | 1726797 A1 * | 11/2006 | ........... | C04B 35/565 |
| JP | 04-081509 A1 | 3/1992 | | |
| JP | 09-036001 A1 | 2/1997 | | |
| JP | 2002-254622 A1 | 9/2002 | | |
| JP | 2004-73945 A | 3/2004 | | |
| JP | 2005-194935 A1 | 7/2005 | | |
| JP | 2008-014239 A1 | 1/2008 | | |
| JP | 2009-189921 A1 | 8/2009 | | |
| JP | 2011-228470 A1 | 11/2011 | | |
| JP | 2011-256816 A1 | 12/2011 | | |
| WO | 2007/072694 A1 | 6/2007 | | |

OTHER PUBLICATIONS

Extended European Search Report, European Application No. 13767727.4, dated Apr. 22, 2015 (7 pages).

International Search Report and Written Opinion (Application No. PCT/JP2013/054627) dated Apr. 16, 2013.

Japanese Office Action (Application No. 2014-507535) dated Aug. 9, 2016 (with English translation).

* cited by examiner

INFORMATION-DISPLAY-EQUIPPED ELECTRIC-HEATING-TYPE HEATER AND METHOD OF USING INFORMATION THEREFOR

BACKGROUND OF THE INVENTION

1. Field of the Invention

The present invention relates to an information-display-equipped electric-heating-type heater for use in raising a temperature of a catalyst to an operation temperature thereof in an early stage in a catalyst converter for use in purifying an exhaust gas of a car or the like.

2. Description of Related Art

In a catalyst converter for use in purifying an exhaust gas of a car or the like, an electric-heating-type heater has been used to raise a temperature of a catalyst to an operation temperature thereof in an early stage. Such an electric-heating-type heater includes a honeycomb structure made of a conductive material and a pair of electrodes disposed in the honeycomb structure, and the honeycomb structure is energized by the electrodes to generate heat (e.g., see Patent Document 1).

CITATION LIST

Patent Document

[Patent Document 1] JP-A-H04-81509

SUMMARY OF THE INVENTION

Problem to be Solved by the Invention

In general, an electric-heating-type heater is contained in a tubular metal case (a can member) (canning) and used in the form of a converter, but a failure occurs sometimes in this converter forming step. One of methods to detect this failure and specify a failure portion is a method in which a resistance value prior to the canning of a honeycomb structure is beforehand managed, and to this resistance value, a change of the resistance value after the canning is checked.

Furthermore, in the electric-heating-type heater, a catalyst loaded onto the honeycomb structure deteriorates, and cracks are generated sometimes in the honeycomb structure due to long-term use. One of methods to detect this deterioration of the catalyst and the generation of the cracks of the honeycomb structure is a method in which an initial resistance value of the honeycomb structure is beforehand managed, and to the resistance value, a change of the resistance value with time during the use is monitored.

Furthermore, during the use of the electric-heating-type heater, it is important to control energization conditions such as necessity of energization, introduced power and energization time for the purpose of inhibiting useless energy consumption and preventing the generation of the cracks of the honeycomb structure due to excessive heat generation. For example, when the temperature of the honeycomb structure rises more than necessary, it is judged that the energization is not necessary and the energization is stopped, so that the useless energy consumption can be inhibited. Furthermore, a necessary power is supplied for a necessary time to set the honeycomb structure to a desired temperature, so that the useless energy consumption can be inhibited and thermal damages such as cracks of the honeycomb structure can be inhibited. Such control of the energization conditions is executed by inputting information such as the resistance value of the honeycomb structure, NTC characteristics, and a heat generation speed and a heat generation distribution when a constant power is applied, into a control system of the electric-heating-type heater, and hence it is necessary to manage the information.

Consequently, in the electric-heating-type heater, it is necessary to manage information concerning a heater performance during the converter formation or the use. However, for a conventional electric-heating-type heater, such information has not been displayed in the electric-heating-type heater, but has been recorded in paper or the like and managed. In consequence, there have been the problems that the individual electric-heating-type heater and the information concerning the heater performance cannot integrally be handled and that management is laborious. Furthermore, there has also been the problem that among a plurality of electric-heating-type heaters, misidentification of information or loss of recorded information occurs.

The present invention has been developed in view of the abovementioned problem, and an object thereof is to provide an information-display-equipped electric-heating-type heater in which it is possible to integrally handle the electric-heating-type heater and information concerning a heater performance of the electric-heating-type heater; and a method of using the above information.

Means for Solving the Problem

According to a first aspect of the present invention, an information-display-equipped electric-heating-type heater including a tubular honeycomb structure made of a conductive material having porous partition walls to define and form a plurality of cells which become through channels for a fluid and extend from one end face to the other end face is provided, and a circumferential wall positioned in an outermost circumference; and a pair of electrodes disposed on the circumferential wall of the honeycomb structure, wherein information concerning a heater performance of the electric-heating-type heater is displayed in the honeycomb structure.

According to a second aspect of the present invention, the information-display-equipped electric-heating-type heater according to the above first aspect is provided, wherein the information concerning the heater performance is at least one selected from the group consisting of a resistance value, NTC characteristics, and a heat generation speed and a heat generation distribution when a constant power is applied.

According to a third aspect of the present invention, the information-display-equipped electric-heating-type heater according to the above second aspect is provided, wherein as the at least one piece of information, the resistance value is included.

According to a fourth aspect of the present invention, the information-display-equipped electric-heating-type heater according to the above second aspect is provided, wherein as the at least one piece of information, all of the resistance value, the NTC characteristics, and the heat generation speed and the heat generation distribution when the constant power is applied are included.

According to a fifth aspect of the present invention, the information-display-equipped electric-heating-type heater according to any one of the above first to fourth aspects is provided, wherein a thickness of the circumferential wall is from 0.1 to 0.5 mm.

According to a sixth aspect of the present invention, the information-display-equipped electric-heating-type heater according to any one of the above first to fifth aspects is provided, wherein a circumferential coating layer to coat a part of the circumferential wall is formed on the circumferential wall of the honeycomb structure, and the information concerning the heater performance is displayed on the circumferential coating layer.

According to a seventh aspect of the present invention, the information-display-equipped electric-heating-type heater according to the above sixth aspect is provided, wherein a thickness of the circumferential coating layer is from 0.01 to 0.5 mm.

According to an eighth aspect of the present invention, the information-display-equipped electric-heating-type heater according to the above sixth or seventh aspects is provided, wherein (a+b)/a is from 1.1 to 6, in which a is the thickness of the circumferential wall and b is the thickness of the circumferential coating layer.

According to a ninth aspect of the present invention, the information-display-equipped electric-heating-type heater according to any one of the above sixth to eighth aspects is provided, wherein the circumferential coating layer is formed of a material including a metal or a metal compound which develops a color by laser irradiation.

According to a tenth aspect of the present invention, the information-display-equipped electric-heating-type heater according to any one of the above sixth to ninth aspects is provided, wherein the circumferential coating layer is formed at a position of 0.1 mm or more distant from each of the electrodes.

According to an eleventh aspect of the present invention the information-display-equipped electric-heating-type heater according to any one of the above sixth to tenth aspects is provided, wherein $\beta/(180-\alpha)$ is from 0.01 to 0.8, in which $\alpha(°)$ is an angle of a central angle of each of the electrodes and $\beta(°)$ is an angle of a central angle of the circumferential coating layer in a cross section perpendicular to an extending direction of the cells.

According to a twelfth aspect of the present invention, the information-display-equipped electric-heating-type heater according to any one of the above first to eleventh aspects is provided, wherein a catalyst is loaded onto the partition walls.

According to a thirteenth aspect of the present invention, a method of using information displayed in an information-display-equipped electric-heating-type heater, in which the information-display-equipped electric-heating-type heater according to the above third aspect is used, and the information concerning the heater performance displayed in the information-display-equipped electric-heating-type heater is used to perform detection of a failure generated in a step of forming a converter of the information-display-equipped electric-heating-type heater and determination of a failure portion, wherein when the information-display-equipped electric-heating-type heater is contained in a tubular metal case to form the converter, the method includes beforehand reading the information concerning the heater performance displayed in the information-display-equipped electric-heating-type heater; and comparing a resistance value of the information-display-equipped electric-heating-type heater contained in the tubular metal case with a resistance value which is one piece of the information concerning the heater performance, to perform the detection of the failure generated in the converter forming step and the determination of the failure portion (a first using method).

According to a fourteenth aspect of the present invention, a method of using information displayed in an information-display-equipped electric-heating-type heater, in which the information-display-equipped electric-heating-type heater according to the above third aspect is used, and the information concerning the heater performance displayed in the information-display-equipped electric-heating-type heater is used to detect deterioration of the information-display-equipped electric-heating-type heater with time, the method including beforehand reading the information concerning the heater performance displayed in the information-display-equipped electric-heating-type heater; and monitoring, to a resistance value which is one piece of information concerning the heater performance, a change of a resistance value of the information-display-equipped electric-heating-type heater with time during use, in order to detect the deterioration of the information-display-equipped electric-heating-type heater with time (a second using method).

According to a fifteenth aspect of the present invention, a method of using information displayed in an information-display-equipped electric-heating-type heater, in which the information-display-equipped electric-heating-type heater according to the above fourth aspect is used, and the information concerning the heater performance displayed in the information-display-equipped electric-heating-type heater is used to control energization conditions of the information-display-equipped electric-heating-type heater, the method including beforehand reading the information concerning the heater performance displayed in the information-display-equipped electric-heating-type heater; and inputting a resistance value, NTC characteristics, and a heat generation speed and a heat generation distribution when a constant power is applied, which are the information concerning the heater performance, into a control system of the information-display-equipped electric-heating-type heater, in order to control the energization conditions of the information-display-equipped electric-heating-type heater on the basis of the input information (a third using method).

Effect of the Invention

In an information-display-equipped electric-heating-type heater of the present invention, information concerning a heater performance of the heater is displayed in the electric-heating-type heater itself, and hence the individual electric-heating-type heater and the information concerning the heater performance of the heater can integrally be handled. As a result, management of the information is facilitated, and among a plurality of electric-heating-type heaters, misidentification of information and loss of recorded information can be prevented from occurring. Furthermore, according to a method of using the information displayed in the information-display-equipped electric-heating-type heater of the present invention, the information concerning the heater performance of the electric-heating-type heater can directly be read from the information-display-equipped electric-heating-type heater itself, and the information can be utilized in each type of use application. Specifically, on the basis of the information, it is possible to perform detection of a failure generated in a converter forming step of the information-display-equipped electric-heating-type heater, determination of a failure portion, detection of deterioration of the information-display-equipped electric-heating-type heater with time, and control of energization conditions of the information-display-equipped electric-heating-type heater.

DETAILED DESCRIPTION OF THE INVENTION

Hereinafter, an embodiment of the present invention will specifically be described. It should be understood that the present invention is not limited to the following embodiment, and the following embodiment to which a change, an improvement or the like is suitably added also falls in the scope of the present invention on the basis of ordinary knowledge of a person skilled in the art without departing from the gist of the present invention.

Figure 1:
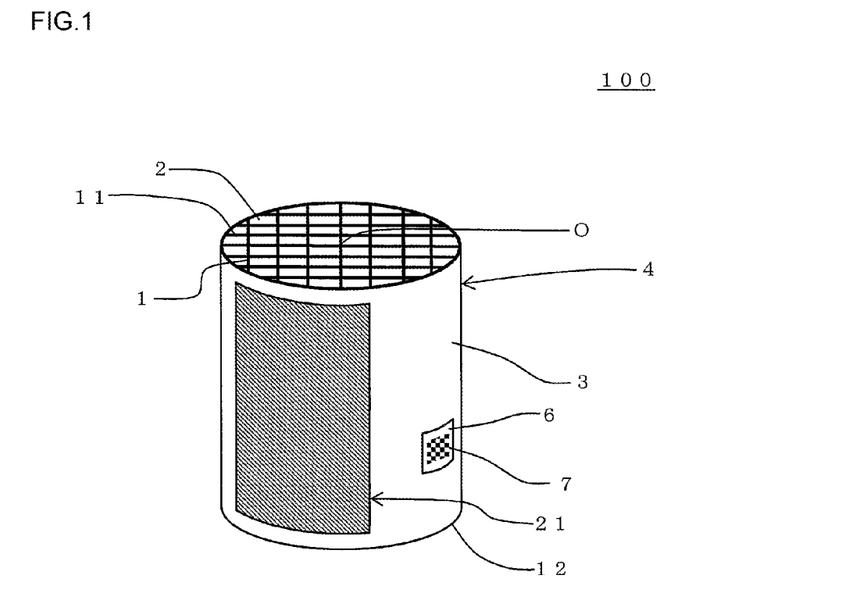
FIG. 1 is a perspective view schematically showing one embodiment of an information-display-equipped electric-heating-type heater of the present invention.
Figure 2:
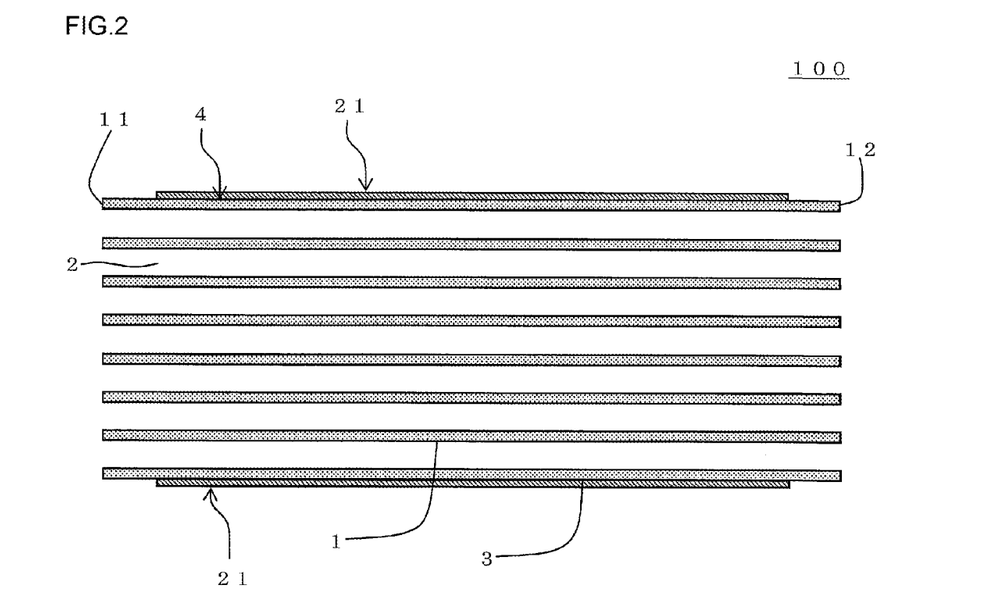
FIG. 2 is a schematic view showing a cross section parallel to an extending direction of cells of the one embodiment of the information-display-equipped electric-heating-type heater of the present invention.
Figure 3:
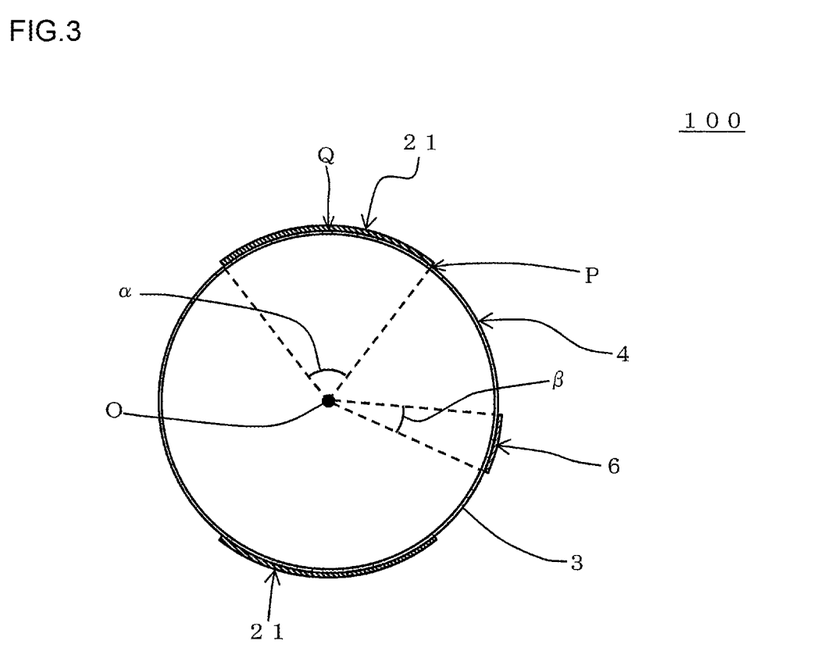
FIG. 3 is a schematic view showing a cross section perpendicular to the extending direction of the cells of the one embodiment of the information-display-equipped electric-heating-type heater of the present invention.

(1) Electric-Heating-Type Heater:

As shown in FIGS. 1 to 3, an information-display-equipped electric-heating-type heater 100 of the present invention includes a honeycomb structure 4 and a pair of electrodes 21, 21. It is to be noted that in the present description, "the information-display-equipped electric-heating-type heater" is simply referred to as "the electric-heating-type heater" sometimes. The honeycomb structure 4 is a tubular structure made of a conductive material, and has porous partition walls 1 to define and form a plurality of cells 2 which become through channels for a fluid and extend from one end face 11 to the other end face 12, and a circumferential wall 3 positioned in an outermost circumference. The pair of electrodes 21, 21 are disposed on the circumferential wall 3 of the honeycomb structure 4. FIG. 1 is a perspective view schematically showing one embodiment of the information-display-equipped electric-heating-type heater of the present invention. FIG. 2 is a schematic view showing a cross section parallel to an extending direction of the cells of the one embodiment of the information-display-equipped electric-heating-type heater of the present invention. FIG. 3 is a schematic view showing a cross section perpendicular to the extending direction of the cells of the one embodiment of the information-display-equipped electric-heating-type heater of the present invention. It is to be noted that in FIG. 3, the partition walls are omitted.

The information-display-equipped electric-heating-type heater 100 of the present invention has a main characteristic that information (hereinafter, simply referred to as "the information" sometimes) 7 concerning a heater performance of the electric-heating-type heater 100 is displayed in the honeycomb structure 4. Therefore, the individual electric-heating-type heater 100 and the information 7 concerning the heater performance of the heater can integrally be handled. As a result, management of the information is facilitated. Furthermore, among a plurality of electric-heating-type heaters, misidentification of the information or loss of the information can be prevented from occurring as in a case where the information is managed separately from the electric-heating-type heater. Here, "information-display-equipped" in the information-display-equipped electric-heating-type heater 100 of the present invention means that the information 7 is displayed in the honeycomb structure 4.

As a display format of the information, in addition to characters, a one-dimensional code such as a bar code or a two-dimensional code such as data matrix (Data Matrix) is suitably usable. The information can be displayed by ink application (printing), sealing by a stamp (stamping), laser irradiation by a laser marker (laser marking) or the like. It is to be noted that when the information is displayed in ink, an ink jetting method or a thermal transfer method is preferably used.

The information to be displayed in the honeycomb structure 4 is preferably at least one piece of information selected from the group consisting of the resistance value, NTC characteristics, and a heat generation speed and a heat generation distribution when a constant power is applied. It is to be noted that the NTC (Negative Temperature Coefficient) characteristics are characteristics indicating a degree of decrease of a resistance accompanying a temperature rise.

A kind of information to be specifically displayed is selected in accordance with a use purpose of the information. For example, when the electric-heating-type heater is contained in a tubular metal case (canning) to form a converter, in the purpose of performing detection of a failure generated in this converter forming step and determination of a failure portion, at least the resistance value is preferably displayed. This is because the detection of the failure generated in the converter forming step and the determination of the failure portion can be performed by comparing the resistance value after the canning of the electric-heating-type heater with the resistance value prior to the canning of the electric-heating-type heater.

Furthermore, also in the purpose of detecting deterioration of the electric-heating-type heater with time, at least the resistance value is preferably displayed. This is because the deterioration of the electric-heating-type heater with time (the deterioration of a loaded catalyst, the generation of cracks of the honeycomb structure, and the like) can be detected by monitoring a change of the resistance value with time during the use related to a resistance value prior to the use of the electric-heating-type heater (in an initial stage).

Furthermore, in the purpose of controlling energization conditions of the electric-heating-type heater, the resistance value, the NTC characteristics, and the heat generation speed and the heat generation distribution when the constant power is applied are preferably displayed. This is because by inputting the information into the control system of the electric-heating-type heater, the energization conditions of the electric-heating-type heater can be controlled on the basis of the input information.

The information 7 may directly be displayed in the circumferential wall 3 of the honeycomb structure 4, but as in the embodiment of FIG. 1, a circumferential coating layer 6, which coats a part of the circumferential wall 3, is preferably formed on the circumferential wall 3 of the honeycomb structure 4 and the information 7 is preferably displayed on the circumferential coating layer 6. When the information is displayed on the circumferential coating layer 6 in this manner, the circumferential wall 3 is not damaged also in a case where the information is displayed by a method involving a physical change and/or a chemical change of a display portion as in the laser marking. Therefore, due to the damages of the circumferential wall 3 during the display of the information 7, damages by heat stress or the like during the energization and the use can be prevented from being generated.

A thickness of the circumferential wall 3 is preferably from 0.1 to 0.5 mm, more preferably from 0.15 to 0.4 mm, and further preferably from 0.2 to 0.35 mm. When the thickness of the circumferential wall 3 is smaller than 0.1 mm, strength is not sufficiently obtained, and when the thickness is in excess of 0.5 mm, a temperature difference in each portion of the circumferential wall 3 easily spreads, and a thermal shock resistance deteriorates sometimes.

A thickness of the circumferential coating layer 6 is preferably from 0.01 to 0.5 mm, more preferably from 0.03 to 0.4 mm, and further preferably from 0.05 to 0.3 mm. When the thickness of the circumferential coating layer 6 is smaller than 0.01 mm, the displayed information 7 is not easily read sometimes, and when the thickness is in excess of 0.5 mm, a difference is made in heat capacity between a portion where the circumferential coating layer 6 is formed and a portion where the circumferential coating layer is not formed, and hence the temperature difference increases. Furthermore, when the heat stress is generated in a boundary between these portions, the thermal shock resistance deteriorates sometimes.

Furthermore, (a+b)/a is preferably from 1.1 to 6, more preferably from 1.1 to 3.6, and further preferably from 1.1 to 2.5, in which a is a thickness of the circumferential wall 3 and b is a thickness of the circumferential coating layer 6. When (a+b)/a is smaller than 1.1, the thickness of the circumferential coating layer 6 is excessively small to the thickness of the circumferential wall 3, and hence the displayed information 7 is not easily identified sometimes. Furthermore, when (a+b)/a is in excess of 6, the thickness of the circumferential coating layer 6 is excessively large to the thickness of the circumferential wall 3. Therefore, a temperature difference of a circumferential portion increases, and the thermal shock resistance deteriorates sometimes.

The circumferential coating layer 6 is preferably formed of a material including a metal or a metal compound which develops a color by the laser irradiation. It is to be noted that "the development of the color" mentioned herein means that the color changes to a color different from an original color (the color prior to the laser irradiation). When the information 7 is directly displayed in the circumferential wall 3, a contrast between the color of the displayed characters or the like and the color of the circumferential wall 3 is low depending on the color of the circumferential wall 3, and the information 7 is not easily read sometimes. In particular, during the reading of the information 7 by a scanner, when this contrast is low, a reading mistake is easily made. When the circumferential coating layer 6 is formed of the material including the metal or the metal compound which develops the color by the laser irradiation, and the information 7 is displayed by the laser marking, the displayed characters or the like only develop the color different from the original color of the circumferential coating layer 6. Therefore, the contrast between the color of the characters or the like which develop the color and the color of a surrounding (a background) which does not develop the color is heightened, and the information 7 is easily read.

Examples of the metal or the metal compound which develops the color by the laser irradiation include silicon carbide, silicon, titania, aluminum nitride and the like. Furthermore, examples of a forming material of the circumferential coating layer 6 except the metal or the metal compound which develops the color by the laser irradiation include ceramics such as cordierite, silicon nitride, alumina, mullite, zirconia, zirconium phosphate, and aluminum titanate. A blend ratio of these ceramics with the metal or the metal compound which develops the color by the laser irradiation is preferably from 20 to 400 parts by mass of the metal or the metal compound which develops the color by the laser irradiation to 100 parts by mass of the ceramics. When the blend ratio of the metal or the metal compound which develops the color by the laser irradiation is smaller than 20 parts by mass to 100 parts by mass of the ceramics, the color is not sufficiently developed even by the laser irradiation sometimes. Furthermore, when the blend ratio is in excess of 400 parts by mass, a difference in thermal expansion coefficient between the circumferential coating layer 6 and the honeycomb structure 4 increases, and the thermal shock resistance deteriorates sometimes.

Examples of laser light for use during the laser marking include carbon dioxide ($CO_2$) laser, YAG laser, $YVO_4$ laser and the like. Laser irradiation conditions can suitably be selected in accordance with a type of laser for use. However, for example, when the $CO_2$ laser is used, the laser marking is preferably performed at an output of 15 to 25 W and a scanning speed of 400 to 600 mm/s. The marking is performed on such conditions, whereby the color is developed so that an irradiated portion possesses a dark color such as a black color to a green color, and a contrast between the irradiated portion and a non-irradiated portion is sufficiently heightened. Therefore, the information can remarkably suitably be read.

The circumferential coating layer 6 is preferably formed at a position of 0.1 mm or more distant from the electrode 21, more preferably formed at a position of 3 mm or more distant therefrom, and further preferably formed at a position of 5 mm or more distant therefrom. When the circumferential coating layer 6 is formed at a position less than 0.1 mm distant from the electrode 21, a current excessively flows due to the metal or the metal compound included in the circumferential coating layer 6, and an unevenness occurs in a temperature distribution of the honeycomb structure sometimes. It is to be noted that a distance of the circumferential coating layer 6 from the electrode 21 is preferably 50 mm or less.

As shown in FIG. 2, each of the pair of electrodes 21, 21 is preferably formed in the form of a band extending in the extending direction of cells 2 of the honeycomb structure 4. Furthermore, as shown in FIG. 3, in a cross section perpendicular to the cell extending direction, one electrode 21 in the pair of electrodes 21, 21 is preferably disposed on a side opposite to the other electrode 21 via a center O of the honeycomb structure 4. According to such a constitution, an unevenness of the current flowing through the honeycomb structure 4 can be inhibited, and hence an unevenness of the heat generation in the honeycomb structure 4 can be inhibited.

Furthermore, an angle of a central angle of the electrode 21 in the above cross section is $\alpha(°)$ and an angle of a central angle of the circumferential coating layer 6 is $\beta(°)$. At this time, $\beta/(180-\alpha)$ is preferably from 0.01 to 0.8, further preferably from 0.1 to 0.7, and especially preferably from 0.2 to 0.6. $\beta/(180-\alpha)$ indicates a ratio of a length (the length of a circumferential direction) of the circumferential coating layer 6 to a length of a circumference of the honeycomb structure 4. When $\beta/(180-\alpha)$ is smaller than 0.01, the information displayed in the circumferential coating layer 6 is not easily read sometimes. When $\beta/(180-\alpha)$ is in excess of 0.8, the current excessively flows due to the metal or the metal compound included in the circumferential coating layer 6, and the unevenness is generated in the temperature distribution of the honeycomb structure 4 sometimes.

Here, as shown in FIG. 3, "the center O of the honeycomb structure 4" means the center of a circle, when the cross section perpendicular to the cell extending direction is circular. Furthermore, when the cross section perpendicular to the cell extending direction is non-circular, the center of the largest circle included in the cross section is meant. Furthermore, "the central angle of the electrode 21" is an angle formed by two line segments connecting both ends of the electrode 21 to the center O of the honeycomb structure 4 in the cross section perpendicular to the cell extending direction. Furthermore, "the central angle of the circumferential coating layer 6" is an angle formed by the two line segments connecting both ends of the circumferential coating layer 6 to the center O of the honeycomb structure 4 in the cross section perpendicular to the cell extending direction.

There is not any special restriction on a constituting material of the honeycomb structure 4, as long as the material is a conductive material which generates heat by energization. However, the material preferably includes a silicon-silicon carbide composite material or silicon carbide as a main component, and is further preferably the silicon-silicon carbide composite material or silicon carbide. Here, when "the material includes silicon carbide particles and silicon as main components", it is meant that the silicon carbide particles and silicon are contained as much as 90 mass % or more of the whole material. It is to be noted that the silicon-silicon carbide composite material contains the silicon carbide particles as aggregates and silicon as a bonding material which bonds the silicon carbide particles, and the plurality of silicon carbide particles are preferably bonded by silicon so that pores are formed among the silicon carbide particles.

A thickness of the electrode 21 is preferably from 0.01 to 5 mm and further preferably from 0.01 to 3 mm. In such a range, the honeycomb structure 4 easily uniformly generates the heat. When the thickness of the electrode 21 is less than 0.01 mm, an electric resistance is increased, and the honeycomb structure 4 does not easily uniformly generate the heat sometimes. Furthermore, when the thickness of the electrode 21 is larger than 5 mm, the electrode is damaged sometimes during the canning.

The electrode 21 preferably includes the silicon carbide particles and silicon as the main components, and is further preferably formed of the silicon carbide particles and silicon as raw materials except usually contained impurities. Here, when the electrode "includes the silicon carbide particles and silicon as the main components", it is meant that a total mass of the silicon carbide particles and silicon is 90 mass % or more of the mass of the whole electrode. In this way, the electrode 21 includes the silicon carbide particles and silicon as the main components, whereby the components of the electrode 21 and the components of the honeycomb structure 4 are the same components or close components (when the material of the honeycomb structure is silicon carbide). Therefore, thermal expansion coefficients of both the electrode and the honeycomb structure have the same value or close values. Furthermore, the materials are the same or close to each other, and hence bonding strength between the electrode 21 and the honeycomb structure 4 also heightens. Therefore, even when the heat stress is applied to the honeycomb structure, the electrode 21 can be prevented from peeling from the honeycomb structure 4, or a bonding portion between the electrode 21 and the honeycomb structure 4 can be prevented from being damaged.

A thickness of the partition walls 1 of the honeycomb structure 4 is preferably from 50 to 200 μm and further preferably from 70 to 130 μm. When the thickness of the partition walls 1 is in such a range, a pressure loss during flowing of an exhaust gas can be inhibited from being excessively large even in a case where the catalyst is loaded onto the partition walls 1. When the thickness of the partition walls 1 is less than 50 μm, strength of the honeycomb structure 4 deteriorates sometimes. Furthermore, when the thickness of the partition walls 1 is larger than 200 μm, the pressure loss during the flowing of the exhaust gas increases sometimes in the case where the catalyst is loaded onto the partition walls 1.

In the honeycomb structure 4, a cell density is preferably from 40 to 150 cells/cm$^2$ and further preferably from 70 to 100 cells/cm$^2$. When the cell density is in such a range, a purification performance of the catalyst can be heightened in a state where the pressure loss during the flowing of the exhaust gas is decreased. When the cell density is lower than 40 cells/cm$^2$, a catalyst loading area becomes smaller sometimes. Furthermore, when the cell density is higher than 150 cells/cm$^2$, the pressure loss during the flowing of the exhaust gas increases sometimes in the case where the catalyst is loaded onto the partition walls 1 of the honeycomb structure 4.

A porosity of the partition walls 1 of the honeycomb structure 4 is preferably from 35 to 60% and further preferably from 35 to 45%. When the porosity of the partition walls 1 is smaller than 35%, deformation during firing enlarges sometimes. Furthermore, when the porosity of the partition walls 1 is in excess of 60%, the strength of the honeycomb structure 4 deteriorates sometimes. It is to be noted that the porosity is a value measured by a mercury porosimeter.

An average pore diameter of the partition walls 1 of the honeycomb structure 4 is preferably from 2 to 15 μm and further preferably from 4 to 8 μm. When the average pore diameter of the partition walls 1 is smaller than 2 μm, an electric resistivity becomes excessively large sometimes. Furthermore, when the average pore diameter of the partition walls 1 is larger than 15 μm, the electric resistivity becomes excessively small sometimes. It is to be noted that the average pore diameter is a value measured by the mercury porosimeter.

A cell shape of the honeycomb structure 4 (a shape of the cells 2 in a cross section perpendicular to an extending direction of the cells 2) is preferably a quadrangular shape, a hexagonal shape, an octagonal shape or any combination of these shapes. In such a cell shape, the pressure loss during the flowing of the exhaust gas through the honeycomb structure 4 becomes smaller, so that the honeycomb structure is excellent in the purification performance of the catalyst.

There is not any special restriction on a shape of the honeycomb structure 4, and examples of the shape include a tubular shape in which a bottom surface has a round shape (a cylindrical shape), a tubular shape in which a bottom surface has an oval shape, and a tubular shape in which a bottom surface has a polygonal shape (a quadrangular shape, a pentangular shape, a hexagonal shape, a heptagonal shape, an octagonal shape or the like). Furthermore, for a size of the honeycomb structure 4, an area of the bottom surface is preferably from 2000 to 20000 mm$^2$ and further preferably from 4000 to 10000 mm$^2$. Furthermore, a length of a central axis direction of the honeycomb structure is preferably from 50 to 200 mm and further preferably from 75 to 150 mm.

The catalyst is preferably loaded onto the partition walls 1 of the honeycomb structure 4. There is not any special restriction on a type of the catalyst to be loaded, but a noble metal such as platinum (Pt), palladium (Pd) or rhodium (Rh) is suitably used.

(2) Manufacturing Method of Electric-Heating-Type Heater:

Next, one example of a manufacturing method of an electric-heating-type heater of the present invention will be explained.

When the honeycomb structure is prepared which is a heat generating portion of the electric-heating-type heater, metal silicon powder (metal silicon), a binder, a surfactant, a pore former, water and the like are first added to silicon carbide powder (silicon carbide) to prepare a forming raw material. To a total of a mass of the silicon carbide powder and a mass of metal silicon, the mass of metal silicon is preferably from 10 to 40 mass %. An average particle diameter of the silicon carbide particles in the silicon carbide powder is preferably from 3 to 50 µm and further preferably from 3 to 40 µm. The average particle diameter of metal silicon (the metal silicon powder) is preferably from 2 to 35 µm. The average particle diameters of the silicon carbide particles and metal silicon (the metal silicon particles) are values measured by laser diffractometry. The silicon carbide particles are fine particles of silicon carbide constituting the silicon carbide powder, and the metal silicon particles are fine particles of metal silicon constituting the metal silicon powder. It is to be noted that this is a blend of forming raw materials, when the material of the honeycomb structure is a silicon-silicon carbide based composite material. When the material of the honeycomb structure is silicon carbide, metal silicon is not added.

Examples of the binder include methylcellulose, hydroxypropyl methylcellulose, hydroxypropoxyl cellulose, hydroxyethyl cellulose, carboxymethyl cellulose and polyvinyl alcohol. Among these binders, methylcellulose and hydroxypropoxyl cellulose are preferably used together. A content of the binder is preferably from 2.0 to 10.0 parts by mass, when a total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like is usable. One of these surfactants may be used alone or any combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former as long as the pore former becomes pores after the firing, and examples of the pore former include graphite, starch, resin balloons, a water absorbable resin, and a silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, a die is clogged with the pore former sometimes during formation. The average particle diameter of the pore former is a value measured by the laser diffractometry. It is to be noted that when the pore former is the water absorbable resin, the average particle diameter is an average particle diameter after the water is absorbed.

Next, the forming raw material is kneaded to form a kneaded material. There is not any special restriction on a method of kneading the forming raw material to form the kneaded material, and an example of the method is a method in which a kneader, a vacuum pugmill or the like is used.

Next, the kneaded material is extruded to form a honeycomb formed body. During the extrusion, a die having a desirable whole shape, cell shape, partition wall thickness, cell density and the like is preferably used. A material of the die is preferably cemented carbide which does not easily wear away. The honeycomb formed body is a structure having partition walls to define and form a plurality of cells which become through channels for a fluid and a circumferential wall positioned in an outermost circumference.

The partition wall thickness, cell density, circumferential wall thickness and the like of the honeycomb formed body can suitably be determined in accordance with a structure of the honeycomb structure to be prepared in consideration of shrinkage in drying and firing.

The obtained honeycomb formed body is preferably dried. There is not any special restriction on a drying method, and examples of the method include electromagnetic heating systems such as microwave heating drying and high-frequency dielectric heating drying, and external heating systems such as hot air drying and superheated steam drying. In these methods, it is preferable that a predetermined amount of water content is dried by the electromagnetic heating system, and then the remaining water content is dried by the external heating system, because the whole formed body can rapidly and uniformly be dried so that any cracks are not generated. As drying conditions, it is preferable that 30 to 99 mass of water content is removed from an amount of the water content prior to the drying by the electromagnetic heating system, and then the water content is reduced to 3 mass or less by the external heating system. As the electromagnetic heating system, the dielectric heating drying is preferable, and as the external heating system, the hot air drying is preferable.

Next, the dried honeycomb formed body is fired by using an electric furnace, a gas furnace or the like. As firing conditions, heating is preferably performed at 1400 to 1500° C. in an inert atmosphere of nitrogen, argon or the like for 1 to 20 hours. Furthermore, after the firing, an oxygenation treatment is preferably performed at 1200 to 1350° C. for 1 to 10 hours, to improve durability.

The catalyst is loaded onto the partition walls of the honeycomb structure obtained in this manner. There is not any special restriction on a loading method of the catalyst, but an example of the method is a method of wash-coating the partition walls of the honeycomb structure with a catalyst loading slurry including a catalyst component such as the above noble metal, and then performing a heat treatment at a high temperature to bake the honeycomb structure. Furthermore, the catalyst may be loaded by a method of adhering the catalyst loading slurry to the partition walls of the honeycomb structure, and then performing the drying and the firing, by use of, for example, a conventionally known membrane forming method such as a dipping method.

A catalyst component such as the noble metal is loaded onto the partition walls in a highly dispersed state. Therefore, the catalyst component may beforehand be loaded once onto a heat-resisting inorganic oxide having such a large specific surface area as in alumna ($Al_2O_3$), and may then be loaded onto the partition walls of the honeycomb structure. For example, when Pd is loaded as the catalyst component, $\gamma$-$Al_2O_3$ powder having a specific surface area of about 200 $m^2/g$ is impregnated with Pd by use of a $Pd(NO_3)_2$ aqueous solution or the like, dried, and then fired at a temperature of about 500° C. to obtain Pd loaded $Al_2O_3$ powder. Furthermore, suitable amounts of water and acetic acid are added to this Pd loaded $Al_2O_3$ powder, followed by wet crushing, whereby the catalyst loading slurry is prepared, and this slurry is loaded onto the partition walls of the honeycomb structure.

Next, an electrode forming raw material to form the electrodes is prepared. When main components of the electrodes are silicon carbide and silicon, the electrode forming raw material is preferably formed by adding predetermined additives to the silicon carbide powder and silicon powder, and kneading.

Specifically, metal silicon powder (metal silicon), a binder, a surfactant, a pore former, water and the like are added to the silicon carbide powder (silicon carbide), and kneaded to prepare a paste-like electrode forming raw material. When a total mass of the silicon carbide powder and metal silicon is 100 parts by mass, the mass of metal silicon is preferably from 20 to 40 parts by mass. An average particle diameter of the silicon carbide particles in the silicon carbide powder is preferably from 10 to 60 μm. An average particle diameter of the metal silicon powder (metal silicon) is preferably from 2 to 20 μm. When the average particle diameter is smaller than 2 μm, the electric resistivity becomes excessively small sometimes. When the average particle diameter is larger than 20 μm, the electric resistivity becomes excessively large sometimes. The average particle diameters of the silicon carbide particles and metal silicon (the metal silicon particles) are values measured by the laser diffractometry. The silicon carbide particles are fine particles of silicon carbide constituting the silicon carbide powder, and the metal silicon particles are fine particles of metal silicon constituting the metal silicon powder. There is not any special restriction on a kneading method and, for example, a vertical stirrer is usable.

Examples of the binder include methylcellulose, hydroxypropyl methylcellulose, hydroxypropoxyl cellulose, hydroxyethyl cellulose, carboxymethyl cellulose and polyvinyl alcohol and the like. Among these binders, methylcellulose and hydroxypropoxyl cellulose are preferably used together. A content of the binder is preferably from 0.1 to 5.0 parts by mass, when a total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like is usable. One of these surfactants may be used alone or any combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former as long as the pore former becomes the pores after the firing, and examples of the pore former include graphite, starch, resin balloons, a water absorbable resin, and a silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, large pores can easily be formed, and strength deterioration occurs sometimes. The average particle diameter of the pore former is a value measured by the laser diffractometry. It is to be noted that when the pore former is the water absorbable resin, the average particle diameter is an average particle diameter after the water is absorbed.

Next, the obtained electrode forming raw material is applied to a side surface of the honeycomb structure. There is not any special restriction on a method of applying the electrode forming raw material to the side surface of the honeycomb structure, but, for example, a printing method is usable. Furthermore, the electrode forming raw material is applied to the side surface of the honeycomb structure so that the material becomes a desirable electrode shape. A thickness of each electrode can be set to a desirable thickness, by regulating the thickness when the electrode forming raw material is applied. In this way, the electrodes can be formed only by applying the electrode forming raw material to the side surface of the honeycomb structure, drying and the firing, so that the electrodes can very easily be formed.

Subsequently, a circumferential coating material to form the circumferential coating layer is prepared. For example, when the main components of the circumferential coating layer are cordierite and silicon carbide, the circumferential coating material is preferably formed by adding predetermined additives to cordierite raw material powder and silicon carbide powder, and kneading.

Specifically, to the cordierite raw material powder, silicon carbide powder, an inorganic binder, an organic binder, clay, water and the like are added and kneaded, to prepare the slurry-like or paste-like circumferential coating material. It is preferable to add 20 to 400 parts by mass of the silicon carbide powder to 100 parts by mass of the cordierite raw material powder. An average particle diameter of the silicon carbide particles in the silicon carbide powder is preferably from 1.0 to 50 μm and further preferably from 1.5 to 20 μm. The silicon carbide powder made of such silicon carbide particles suitably develops a color by irradiation of laser. The average particle diameter of the silicon carbide particles is a value measured by the laser diffractometry. The silicon carbide particles are fine particles of silicon carbide constituting the silicon carbide powder, and the metal silicon particles are fine particles of metal silicon constituting the metal silicon powder.

As the inorganic binder, colloidal silica is suitably usable. An amount of colloidal silica to be added is preferably from 20 to 35 parts by mass and further preferably from 25 to 30 parts by mass to 100 parts by mass of a total of the cordierite raw material powder and the silicon carbide powder. According to such a constitution, it is possible to suitably maintain coating properties and viscosity when the circumferential coating material is applied. Furthermore, the formed circumferential coating layer can securely be bonded so that the layer does not peel from the honeycomb structure due to shock or the like.

Examples of the organic binder include methylcellulose, carboxymethylcellulose, and biopolymer. Examples of the clay include bentonite and montmorillonite.

The circumferential coating material has a viscosity thereof regulated in a range of preferably 100 to 300 dPa·s, further preferably 150 to 250 dPa·s, and especially preferably 180 to 220 dPa·s. According to such a constitution, the coating of the circumferential wall of the honeycomb structure is facilitated. When the viscosity of the circumferential coating material is less than 100 dPa·s, a fluidity of the circumferential coating material is excessively high. Therefore, when the circumferential coating material is applied, the circumferential coating material disadvantageously flows, and it becomes difficult sometimes to form the circumferential coating layer having a sufficient thickness. When the circumferential coating layer becomes thinner, the color is not sufficiently developed even by the irradiation of the laser. On the other hand, when the viscosity is in excess of 300 dPa·s, the fluidity and wettability deteriorate, and the coating properties deteriorate sometimes. Furthermore, the generation of the cracks and defects such as peels are easily generated in the formed circumferential coating layer sometimes.

Such a circumferential coating material is applied to a portion in which the circumferential coating layer on the circumferential wall of the honeycomb structure is to be formed so that the layer has a desirable thickness. Furthermore, this applied circumferential coating material is dried and then thermally treated, whereby the circumferential coating layer is formed.

Next, the information concerning the heater performance is displayed on the circumferential coating layer by, for example, laser marking. Examples of laser light for use in the laser marking include carbon dioxide ($CO_2$) laser, YAG laser, and $YVO_4$ laser. Laser irradiation conditions can suitably be selected in accordance with the type of laser for use. However, for example, when the $CO_2$ laser is used, the laser marking is preferably performed at an output of 15 to 25 W and a scanning speed of 400 to 600 mm/s. The marking is performed on such conditions, whereby the color is developed so that an irradiated portion possesses a dark color such as a black color to a green color, and a contrast between the irradiated portion and a non-irradiated portion is sufficiently heightened. Therefore, the information can remarkably suitably be read.

(3) Using Method of Information Displayed in Electric-Heating-Type Heater:

Next, the using method of the information displayed in the electric-heating-type heater of the present invention will be explained.

(3-1) First Using Method

In a first using method, the information concerning the heater performance displayed in the electric-heating-type heater is used to perform the detection of the failure generated in the step of forming the converter of the electric-heating-type heater and the determination of the failure portion. In this using method, as the information concerning the heater performance, the resistance value is required, and hence the electric-heating-type heater, in which at least the resistance value is displayed, is used. As a specific using method, when such an electric-heating-type heater as described above is contained in a tubular metal case (canning) to form the converter, the information concerning the heater performance displayed in the electric-heating-type heater is beforehand read. Then, the resistance value of the electric-heating-type heater after the heater is contained in the tubular metal case (the canning) is measured, and compared with a resistance value as one piece of the information concerning the heater performance which is beforehand read, thereby performing the detection of the failure generated in the converter forming step and the determination of the failure portion.

Specifically, when the resistance value read before the canning is clearly different from the resistance value after the canning, it can be considered that the failure is generated in the converter forming step. Furthermore, in this case, when the resistance value after the canning is higher than the resistance value before the canning, it is considered that the failure includes cracks of a substrate portion (the honeycomb structure), peeling and breakdown of the electrodes, or a contact failure between an external electrode and the electrode (the electrode on the side of the heater).

(3-2) Second Using Method

In a second using method, to detect deterioration of the electric-heating-type heater with time (deterioration of the catalyst, generation of the cracks of the honeycomb structure, and the like), the information concerning the heater performance displayed in the electric-heating-type heater is used. In this using method, as the information concerning the heater performance, the resistance value is required, and hence the electric-heating-type heater, in which at least the resistance value is displayed, is used. As a specific using method, first, the information concerning the heater performance displayed in the electric-heating-type heater as described above is beforehand read. Then, to the resistance value (an initial resistance value) which is one piece of information concerning this heater performance, a change of the resistance value with time during the use of the electric-heating-type heater is monitored, to detect the deterioration of the electric-heating-type heater with time.

For example, when the catalyst loaded onto the electric-heating-type heater deteriorates, the resistance value increases as compared to the initial resistance value. Furthermore, when the cracks are generated in the honeycomb structure of the electric-heating-type heater, the resistance value increases as compared to the initial resistance value. Therefore, the initial resistance value displayed in the electric-heating-type heater is read, and to the initial resistance value, the change of the resistance value with time during the use of the electric-heating-type heater is monitored, so that the deterioration of the electric-heating-type heater with time can be detected.

(3-3) Third Using Method

In a third using method, to control energization conditions of the electric-heating-type heater, the information concerning the heater performance displayed in the electric-heating-type heater is used. In this using method, as the information concerning the heater performance, there are required the resistance value, NTC characteristics, and a heat generation speed and a heat generation distribution when a constant power is applied, and hence the electric-heating-type heater, in which these pieces of information are displayed, is used. As a specific using method, first, the information concerning the heater performance displayed in the electric-heating-type heater as described above is read. Then, the information concerning the heater performance, i.e., the resistance value, the NTC characteristics, and the heat generation speed and a heat generation distribution when the constant power is applied are input into a control system of the electric-heating-type heater. The energization conditions of the electric-heating-type heater are controlled on the basis of this input information, so that useless energy consumption can be inhibited and the generation of the cracks of the honeycomb structure due to excessive heat generation can be prevented.

Energization conditions of the electric-heating-type heater are controlled on the basis of the resistance value, the NTC characteristics and the heat generation speed and the heat generation distribution when the constant power is applied, which are input into the control system, and examples of the conditions specifically include necessity of energization, introduced power, and energization time. These energization conditions are suitably controlled on the basis of the above input information, so that the useless energy consumption can be inhibited and the generation of the cracks of the honeycomb structure due to the excessive heat generation can be prevented. For example, when the temperature of the honeycomb structure rises more than necessary, it is judged that the energization is not required, and the energization is stopped, so that the useless energy consumption can be inhibited. Furthermore, a necessary power is supplied for a necessary time to set the honeycomb structure to a desired temperature, so that thermal damages such as cracks of the honeycomb structure can be inhibited.

As described above, according to the method of using the information displayed in the electric-heating-type heater of the present invention, the information concerning the heater performance of the electric-heating-type heater is directly read from the electric-heating-type heater itself, so that the information can be utilized in each type of use application.

EXAMPLES

Hereinafter, a manufacturing method of electric-heating-type heater of the present invention will further specifically be explained in accordance with examples, but the present invention is not limited to these examples.

Examples 1 to 16

SiC powder and metal Si powder were mixed at a mass ratio of 80:20, and to this mixture, hydroxypropyl methylcellulose as a binder and a water absorbable resin as a pore former were added. Furthermore, water was added to obtain a forming raw material. Amounts of the added binder, the pore former and the water were 7 parts by mass of the binder, 3 parts by mass of the pore former and 42 parts by mass of the water, when a total of SiC powder and metal Si powder was 100 parts by mass. Furthermore, an average particle diameter of the SiC powder was 20 μm, an average particle diameter of the metal Si powder was 6 μm, and an average particle diameter of the pore former was 20 μm. The average particle diameters of the SiC powder, the metal Si powder and the pore former are values measured by laser diffractometry. This forming raw material was kneaded by a vacuum pugmill, to prepare a columnar kneaded material.

This columnar kneaded material was formed by using an extruder to obtain a honeycomb formed body. The obtained honeycomb formed body was subjected to high frequency dielectric heating drying, dried at 120° C. for two hours by use of a hot air dryer, and then fired at 1450° C. under an argon atmosphere for two hours, to prepare cylindrical honeycomb structures each having a thickness (a) of a circumferential wall as shown in Table 1. For a dimension of the honeycomb structure, a diameter was 93 mm and a length was 100 mm. Furthermore, a cell shape (a shape in a cross section perpendicular to a cell extending direction) was a square, a cell density was 600 cells/square inch (9.3 cells/cm$^2$), and a thickness of partition walls was 130 μm.

Next, commercially available γ-Al$_2$O$_3$ powder having a specific surface area of 200 m$^2$/g was impregnated with Pd by use of a Pd(NO$_3$)$_2$ aqueous solution, dried and then fired at 500° C. to obtain Pd loaded Al$_2$O$_3$ powder. To this Pd loaded Al$_2$O$_3$ powder, suitable amounts of water and acetic acid were added. Furthermore, 30 mass % of CeO$_2$ powder was added, and wet crushing was performed to prepare a catalyst loading slurry. The partition walls of the honeycomb structure was coated with this catalyst loading slurry by a dipping method, followed by the firing at 550° C. in the air atmosphere for one hour, to load a catalyst.

Next, SiC powder and metal Si powder were mixed at a mass ratio of 60:40, and to this mixture, hydroxypropyl methylcellulose as a binder, glycerin as a moisture retaining agent and a surfactant as a dispersing agent were added. Furthermore, water was added and mixed. Amounts of the added binder, glycerin, the surfactant and the water were 0.5 part by mass of the binder, 10 parts by mass of glycerin, 0.3 part by mass of the surfactant and 42 parts by mass of the water, when the total of the SiC powder and the metal Si powder was 100 parts by mass. Furthermore, an average particle diameter of the SiC powder was 52 μm and an average particle diameter of the metal Si powder was 6 μm. The average particle diameters of the SiC powder and the metal Si powder were values measured by the laser diffractometry. This mixture was kneaded by a vertical stirrer to obtain an electrode forming raw material.

This electrode forming raw material was applied onto the circumferential wall of each honeycomb structure in the form of such a band as to extend across both end faces of the honeycomb structure so that a thickness was 1.5 mm and an angle (α) of a central angle had each value shown in Table 1. The electrode forming raw material was applied to two portions of the side surface of the honeycomb structure. Furthermore, in the cross section perpendicular to the cell extending direction, one of the two portions to which the electrode forming raw material was applied was disposed on a side opposite to the other portion via the center of the honeycomb structure.

Subsequently, 100 parts by mass of cordierite raw material powder, 200 parts by mass of SiC powder which develops a color by laser irradiation, and 76 parts by mass of colloidal silica as an inorganic binder and water as a dispersing medium were added, thereby preparing a circumferential coating material to form a circumferential coating layer. 22 parts by mass of the water was used to 100 parts by mass of the total of the cordierite raw material powder and the SiC powder in the circumferential coating material. Furthermore, for the circumferential coating material, 0.15 part by mass of carboxymethylcellulose as an organic binder and 0.9 part by mass of bentonite as a clay component were added to 100 parts by mass of the total of the cordierite raw material powder and the SiC powder. A viscosity of a circumference of the circumferential coating material constituted as described above was 200 dPa·s.

The circumferential coating material obtained as described above was applied onto the circumferential wall of the honeycomb structure so that a thickness (b), an angle (β) of a central angle and a distance from each electrode had values shown in Table 1, respectively. Additionally, a dimension of a portion to which the circumferential coating material was applied in the cell extending direction was 30 mm. After the application, the material was naturally dried at room temperature (25° C.) for 24 hours, and then thermally treated at 600° C. in an electric furnace for one hour to form the circumferential coating layer.

On the circumferential coating layer of an electric-heating-type heater manufactured as described above, there was displayed a two-dimensional code (data matrix, a dimension of a display region: 20 mm×20 mm) in which information concerning a heater performance was coded, on conditions of an output of 20 W and a scanning speed of 500 mm/s by use of a CO$_2$ laser marker.

Example 17

An electric-heating-type heater was manufactured in the same manner as in Example 2, except that a circumferential coating layer was not formed (see Table 1). On a circumferential wall of a honeycomb structure of this electric-heating-type heater, there was displayed a two-dimensional code (data matrix) in which information concerning a heater performance was coded, on conditions of an output of 20 W and a scanning speed of 500 mm/s by use of a CO$_2$ laser marker.

(Evaluation)

As to the electric-heating-type heaters of Examples 1 to 17, a reading test of displayed information, a thermal shock resistance test and an energization test were carried out by methods described in the following. Table 2 shows the results of the evaluation.

(Reading Test of Displayed Information)

It was confirmed by using a handy scanner whether a two-dimensional code (data matrix) displayed in the electric-heating-type heater was readable. A case where the code was repeatedly readable in a short time was evaluated as "○", a case where time was required but the code was readable was evaluated as "Δ", and a case where the code was not readable was evaluated as "x".

(Thermal Shock Resistance Test)

The electric-heating-type heater was contained in a tubular metal case (canning), and a gas heated by a propane gas burner was allowed to flow into the metal case so that the gas passed through the honeycomb structure of the electric-heating-type heater. For temperature conditions of the heated gas allowed to flow into the metal case (inlet gas temperature conditions), a temperature was raised to 950° C. in five minutes from the start of the flowing, held at 950° C. for ten minutes, cooled down to 100° C. for five minutes, and held at 100° C. for ten minutes. The temperature raising and cooling were performed on such conditions, and then it was confirmed whether or not cracks were generated in the honeycomb structure. A case where any cracks were not generated in the honeycomb structure was evaluated as "○", and a case where the cracks were generated was evaluated as "x".

(Energization Test)

A voltage of 200 V was applied to the electric-heating-type heater, and there were measured a temperature of a position P (see FIG. 3) where an end portion of an electrode (an end portion of a circumferential direction) came in contact and a temperature of a position Q (see FIG. 3) where a center point of the circumferential direction of the electrode came in contact, in the cross section of the honeycomb structure which was perpendicular to the cell extending direction. Furthermore, the higher temperature of the temperatures of the two positions was obtained as the highest temperature. One of the two positions in the honeycomb structure is a position where a current flows most and which has the highest temperature. When this highest temperature is 200° C. or less, it can be considered that unevenness of a temperature distribution in the honeycomb structure of the electric-heating-type heater is in an inhibited state.

TABLE 2

| | Reading test of displayed information | Thermal shock resistance test | Energization test (Highest temp.) [° C.] |
|---|---|---|---|
| Example 1 | ○ | ○ | 160 |
| Example 2 | ○ | ○ | 170 |
| Example 3 | ○ | ○ | 160 |
| Example 4 | ○ | ○ | 170 |
| Example 5 | ○ | ○ | 180 |
| Example 6 | ○ | ○ | 190 |
| Example 7 | ○ | ○ | 170 |
| Example 8 | ○ | ○ | 180 |
| Example 9 | ○ | ○ | 190 |
| Example 10 | ○ | ○ | 170 |
| Example 11 | ○ | ○ | 190 |
| Example 12 | ○ | ○ | 190 |
| Example 13 | ○ | ○ | 150 |
| Example 14 | ○ | x (Cracks in circumferential wall) | 160 |
| Example 15 | ○ | ○ | 220 |
| Example 16 | ○ | ○ | 210 |
| Example 17 | Δ | ○ | 150 |

As shown in the above tables, for the electric-heating-type heaters of Examples 1 to 13, a suitable result was obtained in each evaluation test.

In the electric-heating-type heater of Example 14, fine cracks were generated in a circumferential wall in a thermal shock resistance test, but suitable results were obtained in the reading test of the displayed information and the energization test. A position where the cracks were generated was a boundary between a portion where the circumferential coating layer was formed and a portion where the layer was not formed. It can be considered that a reason why the cracks are generated is that the circumferential coating layer is thick, and hence a difference is made in heat capacity between the portion where the circumferential coating layer is formed and the portion where the layer is not formed, to increase a temperature difference, thereby causing heat stress in the boundary.

In the electric-heating-type heater of Example 15, the highest temperature in the energization test was slightly higher, but suitable results were obtained in the reading test of the displayed information and the thermal shock resis-

TABLE 1

| | Thickness (a) of circumferential wall [mm] | Angle (α) of central angle of electrode [°] | Thickness (b) of circumferential coating layer [mm] | Angle (β) of central angle of circumferential coating layer [°] | (a + b)/a | β/(180 − α) | Distance of circumferential coating layer from electrode [mm] |
|---|---|---|---|---|---|---|---|
| Example 1 | 0.2 | 100.0 | 0.1 | 35.0 | 1.50 | 0.44 | 5.0 |
| Example 2 | 0.3 | 100.0 | 0.2 | 35.0 | 1.67 | 0.44 | 5.0 |
| Example 3 | 0.5 | 100.0 | 0.1 | 35.0 | 1.20 | 0.44 | 5.0 |
| Example 4 | 0.5 | 100.0 | 0.2 | 35.0 | 1.40 | 0.44 | 5.0 |
| Example 5 | 0.5 | 100.0 | 0.3 | 35.0 | 1.60 | 0.44 | 5.0 |
| Example 6 | 0.5 | 100.0 | 0.4 | 35.0 | 1.80 | 0.44 | 5.0 |
| Example 7 | 0.3 | 100.0 | 0.1 | 35.0 | 1.33 | 0.44 | 3.0 |
| Example 8 | 0.3 | 100.0 | 0.1 | 35.0 | 1.33 | 0.44 | 1.0 |
| Example 9 | 0.3 | 100.0 | 0.1 | 35.0 | 1.33 | 0.44 | 0.5 |
| Example 10 | 0.2 | 100.0 | 0.1 | 40.0 | 1.50 | 0.50 | 5.0 |
| Example 11 | 0.2 | 120.0 | 0.1 | 35.0 | 1.50 | 0.58 | 4.0 |
| Example 12 | 0.1 | 100.0 | 0.45 | 24.0 | 5.50 | 0.30 | 5.0 |
| Example 13 | 0.2 | 20.0 | 0.1 | 24.0 | 1.50 | 0.15 | 40.0 |
| Example 14 | 0.1 | 100.0 | 0.6 | 35.0 | 7.00 | 0.44 | 5.0 |
| Example 15 | 0.2 | 100.0 | 0.1 | 65.0 | 1.50 | 0.81 | 5.0 |
| Example 16 | 0.3 | 100.0 | 0.1 | 35.0 | 1.33 | 0.44 | Contact with electrode |
| Example 17 | 0.3 | 100.0 | — | — | — | — | — | tance test. Additionally, it can be considered that a reason why the highest temperature is slightly higher is that the central angle of the circumferential coating layer is large, and hence a ratio of a length of the circumferential coating layer to a length of the circumference of the honeycomb structure (a value of (β/(180−α)) enlarges. That is, it is considered that in such a state where the forming range of the circumferential coating layer is broad, the current excessively flows due to a metal compound included in the circumferential coating layer, and unevenness is generated in the temperature distribution of the honeycomb structure.

In the electric-heating-type heater of Example 16, the highest temperature in the energization test was slightly higher, but suitable results were obtained in the reading test of the displayed information and the thermal shock resistance test. It can be considered that a reason why the highest temperature is slightly higher is that the circumferential coating layer comes in contact with the electrodes. That is, it is considered that in such a state where the circumferential coating layer is in contact with the electrodes, the current excessively flows due to the metal compound included in the circumferential coating layer, and the unevenness is generated in the temperature distribution of the honeycomb structure.

In the electric-heating-type heater of Example 17, in the reading test of the displayed information, time was required for the reading, but suitable results were obtained in the thermal shock resistance test and the energization test. Additionally, it can be considered that a reason why time is required to read the displayed information is that the circumferential coating layer is not formed on the circumferential wall and the display of the information by a laser marker is directly performed on the circumferential wall. That is, it is considered that the circumferential wall hardly develops the color in the irradiation of the laser by the laser marker, a contrast between a color of the displayed information and a color of the surrounding (background) is low, and hence time is required for the reading.

INDUSTRIAL APPLICABILITY

The present invention can suitably be utilized as an electric-heating-type heater for use in raising a temperature of a catalyst to an operation temperature thereof in an early stage in a catalyst converter for use in purifying an exhaust gas of a car or the like.

DESCRIPTION OF REFERENCE NUMERALS

1: partition wall, 2: cell, 3: circumferential wall, 4: honeycomb structure, 6: circumferential coating layer, 7: information concerning heater performance, 11: one end face, 12: the other end face, 21: electrode, 100: electric-heating-type heater, α: angle of central angle of electrode, β: angle of central angle of circumferential coating layer, O: center of honeycomb structure, P: position where end portion of electrode comes in contact, and Q: position where central portion of electrode comes in contact.

The invention claimed is:

1. An information-display-equipped electric-heating-type heater comprising:
a tubular honeycomb structure made of a conductive material having porous partition walls to define and form a plurality of cells which become through channels for a fluid and extend from one end face to the other end face, and a circumferential wall positioned in an outermost circumference;
a pair of electrodes disposed on the circumferential wall of the honeycomb structure;
a circumferential coating layer formed on and coating only a portion of the circumferential wall, wherein the circumferential coating layer is circumferentially spaced from each of the electrodes and includes at least one ceramic selected from the group consisting of cordierite, silicon nitride, alumina, mullite, zirconia, zirconium phosphate, and aluminum titanate; and
visual indicia formed on the circumferential coating layer, wherein the visual indicia provides information concerning the heater performance.

2. The information-display-equipped electric-heating-type heater according to claim 1,
wherein the information concerning the heater performance is at least one selected from the group consisting of a resistance value, NTC characteristics, and a heat generation speed and a heat generation distribution when a constant power is applied.

3. The information-display-equipped electric-heating-type heater according to claim 2,
wherein as the at least one piece of information, the resistance value is included.

4. A method of using information displayed in an information-display-equipped electric-heating-type heater, in which the information-display-equipped electric-heating-type heater according to claim 3 is used, and the information concerning the heater performance displayed in the information-display-equipped electric-heating-type heater is used to perform detection of a failure generated in a step of forming a converter of the information-display-equipped electric-heating-type heater and determination of a failure portion,
wherein when the information-display-equipped electric-heating-type heater is contained in a tubular metal case to form the converter, the method comprises beforehand reading the information concerning the heater performance displayed in the information-display-equipped electric-heating-type heater; and comparing a resistance value of the information-display-equipped electric-heating-type heater contained in the tubular metal case with a resistance value which is one piece of the information concerning the heater performance, to perform the detection of the failure generated in the converter forming step and the determination of the failure portion.

5. A method of using information displayed in an information-display-equipped electric-heating-type heater, in which the information-display-equipped electric-heating-type heater according to claim 3 is used, and the information concerning the heater performance displayed in the information-display-equipped electric-heating-type heater is used to detect deterioration of the information-display-equipped electric-heating-type heater with time,
the method comprising:
beforehand reading the information concerning the heater performance displayed in the information-display-equipped electric-heating-type heater; and
monitoring, to a resistance value which is one piece of information concerning the heater performance, a change of a resistance value of the information-display-equipped electric-heating-type heater with time during use, in order to detect the deterioration of the information-display-equipped electric-heating-type heater with time.

6. The information-display-equipped electric-heating-type heater according to claim 2, wherein as the at least one piece of information, all of the resistance value, the NTC characteristics, and the heat generation speed and the heat generation distribution when the constant power is applied are included.

7. A method of using information displayed in an information-display-equipped electric-heating-type heater, in which the information-display-equipped electric-heating-type heater according to claim 6 is used, and the information concerning the heater performance displayed in the information-display-equipped electric-heating-type heater is used to control energization conditions of the information-display-equipped electric-heating-type heater, the method comprising:

beforehand reading the information concerning the heater performance displayed in the information-display-equipped electric-heating-type heater; and inputting a resistance value, NTC characteristics, and a heat generation speed and a heat generation distribution when a constant power is applied, which are the information concerning the heater performance, into a control system of the information-display-equipped electric-heating-type heater, in order to control the energization conditions of the information-display-equipped electric-heating-type heater on the basis of the input information.

8. The information-display-equipped electric-heating-type heater according to claim 1,
wherein a thickness of the circumferential wall is from 0.1 to 0.5 mm.

9. The information-display-equipped electric-heating-type heater according to claim 1, wherein a thickness of the circumferential coating layer is from 0.01 to 0.5 mm.

10. The information-display-equipped electric-heating-type heater according to claim 1, wherein (a+b)/a is from 1.1 to 6, in which a is the thickness of the circumferential wall and b is the thickness of the circumferential coating layer.

11. The information-display-equipped electric-heating-type heater according to claim 1, wherein the circumferential coating layer includes a material including a metal or a metal compound which develops a color by laser irradiation.

12. The information-display-equipped electric-heating-type heater according to claim 1, wherein the circumferential coating layer is formed at a position of 0.1 mm or more distant from each of the electrodes.

13. The information-display-equipped electric-heating-type heater according to claim 1, wherein $\beta/(180-\alpha)$ is from 0.01 to 0.8, in which $\alpha(°)$ is an angle of a central angle of each of the electrodes and $\beta(°)$ is an angle of a central angle of the circumferential coating layer in a cross section perpendicular to an extending direction of the cells.

14. The information-display-equipped electric-heating-type heater according to claim 1,
wherein a catalyst is loaded onto the partition walls.

* * * * *